(12) United States Patent
Tian et al.

(10) Patent No.: US 12,166,680 B1
(45) Date of Patent: Dec. 10, 2024

(54) MESH NETWORKING OF ACCESS POINTS FOR LOAD BALANCING

(71) Applicant: Cable Television Laboratories, Inc., Louisville, CO (US)

(72) Inventors: Jun Tian, Sunnyvale, CA (US); Daniel Rice, Boulder, CO (US); Justin Colwell, Arvada, CO (US); Neeharika Allanki, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/502,008

(22) Filed: Nov. 4, 2023

Related U.S. Application Data

(63) Continuation of application No. 17/315,590, filed on May 10, 2021, now Pat. No. 11,812,303, which is a continuation of application No. 15/456,541, filed on Mar. 12, 2017, now Pat. No. 11,006,318, which is a continuation of application No. 14/601,131, filed on Jan. 20, 2015, now Pat. No. 9,596,622.

(60) Provisional application No. 61/934,663, filed on Jan. 31, 2014.

(51) Int. Cl.
| | |
|---|---|
| *H04L 47/125* | (2022.01) |
| *H04L 45/00* | (2022.01) |
| *H04W 8/04* | (2009.01) |
| *H04W 28/02* | (2009.01) |
| *H04W 28/08* | (2023.01) |
| *H04W 88/08* | (2009.01) |

(52) U.S. Cl.
CPC ............ *H04L 47/125* (2013.01); *H04L 45/22* (2013.01); *H04W 8/04* (2013.01); *H04W 28/0231* (2013.01); *H04W 28/0268* (2013.01); *H04W 28/08* (2013.01); *H04W 88/08* (2013.01)

(58) Field of Classification Search
CPC ........ H04L 47/125; H04L 45/22; H04W 8/04; H04W 28/0231; H04W 28/0268; H04W 28/08; H04W 88/08
See application file for complete search history.

(56) References Cited

U.S. PATENT DOCUMENTS

| | | | |
|---|---|---|---|
| 6,581,104 | B1 | 6/2003 | Bereiter |
| 8,059,540 | B2 | 11/2011 | Yong et al. |
| 2003/0079005 | A1 | 4/2003 | Myers et al. |
| 2003/0164763 | A1 | 9/2003 | Hisano et al. |
| 2004/0229621 | A1 | 11/2004 | Misra |
| 2004/0229821 | A1 | 11/2004 | Kim et al. |
| 2007/0274211 | A1 | 11/2007 | Tsubota |
| 2008/0049753 | A1 | 2/2008 | Heinze et al. |
| 2009/0109855 | A1 | 4/2009 | Gong et al. |
| 2010/0111055 | A1* | 5/2010 | Chiu ............ H04W 24/02 370/338 |
| 2010/0322214 | A1 | 12/2010 | Workman et al. |
| 2014/0204727 | A1 | 7/2014 | Gu et al. |
| 2014/0280910 | A1 | 9/2014 | Swig et al. |
| 2014/0328190 | A1 | 11/2014 | Lord et al. |

\* cited by examiner

*Primary Examiner* — Ayanah S George
(74) *Attorney, Agent, or Firm* — PdZ Patent Law, PLLC

(57) ABSTRACT

A mesh network may be established between a plurality of access points to facilitate load balancing for one or more of the access points. The mesh network may define a plurality of communication routes through the access points having capabilities sufficient to facilitate or mimic communications underperforming or being unavailable at the access point requesting load balancing.

23 Claims, 2 Drawing Sheets

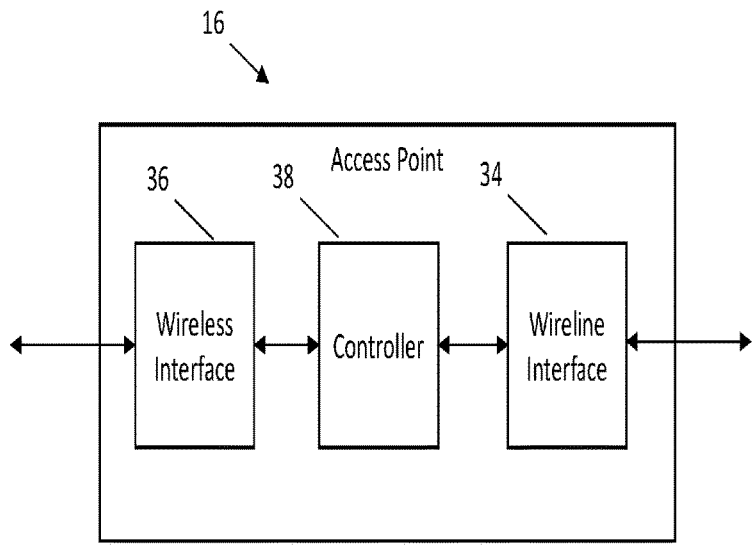
Fig. 2
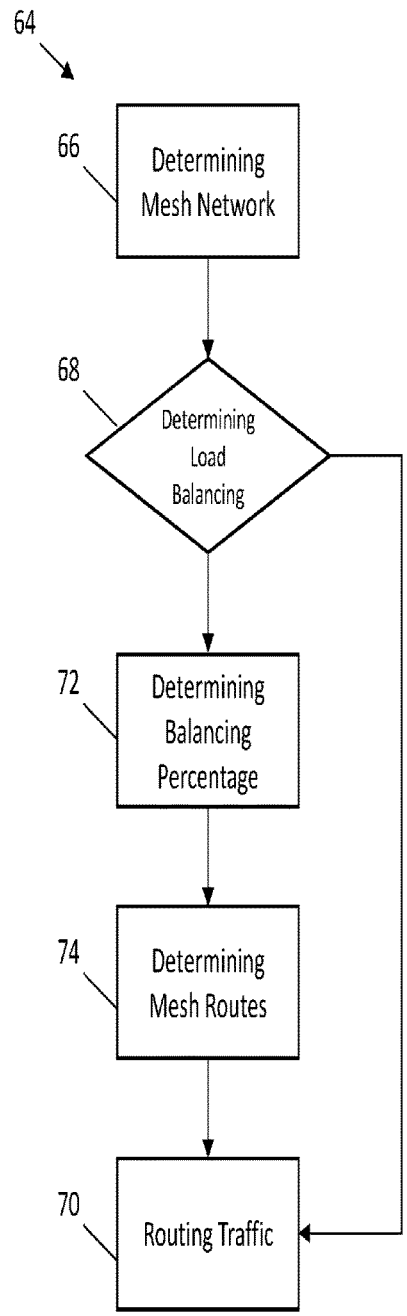
Fig. 3
Fig. 4

MESH NETWORKING OF ACCESS POINTS FOR LOAD BALANCING

CROSS-REFERENCE TO RELATED APPLICATIONS

This application is a continuation of U.S. patent application Ser. No. 17/315,590, filed on May 10, 2021, which is a continuation of U.S. patent application Ser. No. 15/456,541, filed on Mar. 12, 2017, now U.S. Pat. No. 11,006,318, which is a continuation of U.S. patent application Ser. No. 14/601,131, filed on Jan. 20, 2015, now U.S. Pat. No. 9,596,622, which claims benefit of priority to U.S. Provisional Patent Application Ser. No. 61/934,663, filed on Jan. 31, 2014. Each of the aforementioned applications is incorporate herein by reference.

TECHNICAL FIELD

The present invention relates to managing access points and/or other devices providing signaling access to multiple clients, such as but not necessary limited to facilitate load balancing for an access point using a mesh network constructed from neighboring access points.

BACKGROUND

An access point or other suitable device may be configured to provide signaling access to multiple clients, such as to enable high-speed data access, cellular phone access and/or virtually any other type of signaling dependent service. Some access points may be characterized as "last mile" types of devices when configured to interface with clients for the purposes of exchanging related signaling with a node, terminal, system or other long-haul device tasked with facilitating long-haul transport of the related signaling. These types of access points may be configured to interface with clients using wired and/or wireless infrastructures and then exchange related signaling with the long-haul devices using wired and/or wireless infrastructures. A service provider or other operator may place throughput limitations on signaling exchanged between access points and the long-haul device associated therewith. The throughput limitations may be implemented on a per-access-point basis as a result of hardware limitations, communication medium capabilities, licensing/service level agreements or other restrictions otherwise being enforced or necessitated for various reasons. These restrictions can provide an undesirable customer experience when clients associated with a particular access point desire greater throughput than that being made available to the corresponding access point.

BRIEF DESCRIPTION OF THE DRAWINGS

FIG. 2 illustrates an access point in accordance with one non-limiting aspect of the present invention.

FIG. 3 illustrates a routing table generated for the mesh network in accordance with one non-limiting aspect of the present invention.

FIG. 4 illustrates a flowchart of a method for load-balancing in accordance with one non-limiting aspect of the present invention.

DETAILED DESCRIPTION

Figure 1:
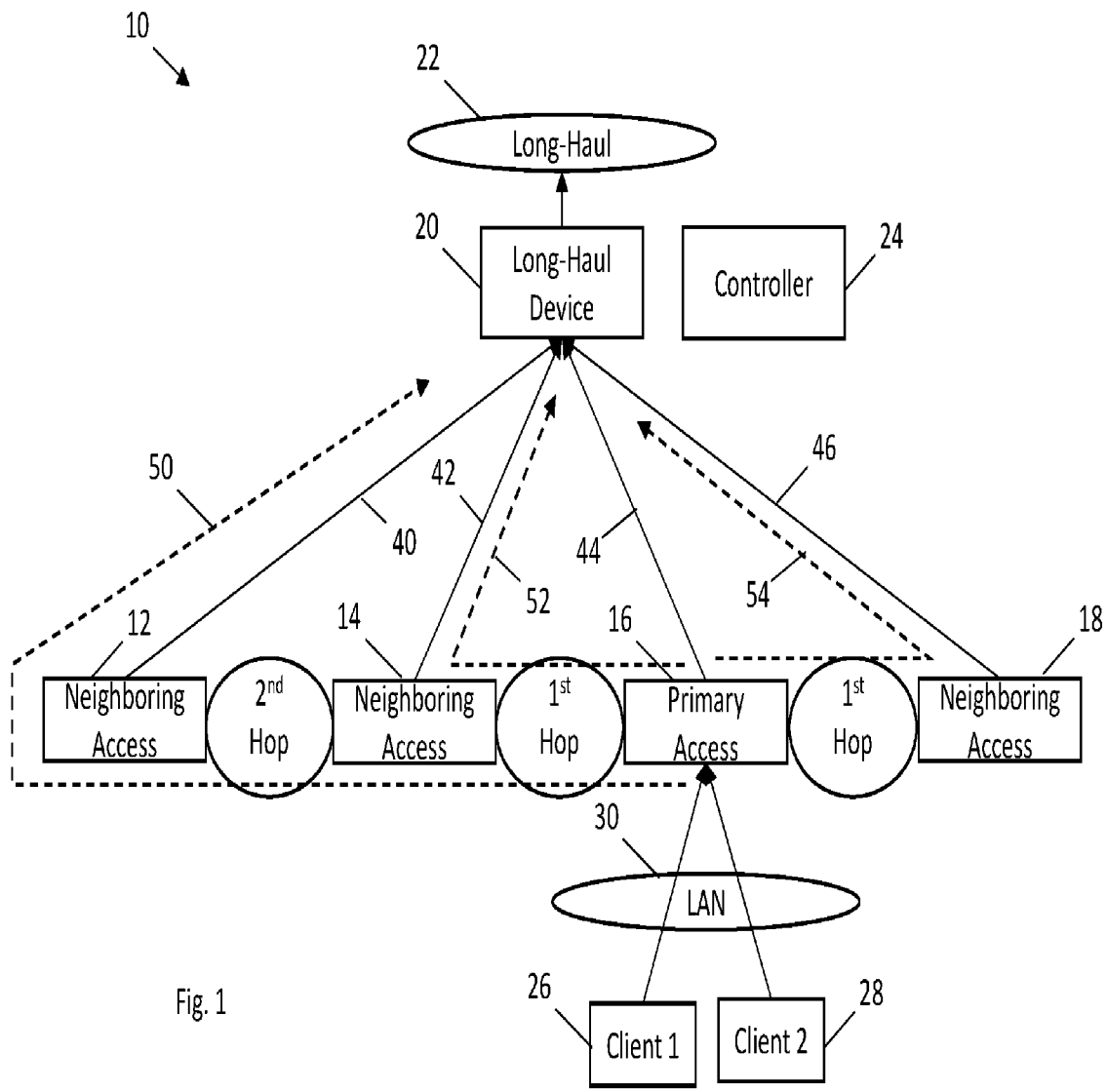
FIG. 1 illustrates a communication system in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a communication system 10 in accordance with one non-limiting aspect of the present invention. The system 10 depicts an exemplary environment having a plurality of access points 12, 14, 16, 18 configured to facilitate interfacing signaling with a long-haul device 20. The long-haul device 20 may be fiber node, cable modem termination system (CMTS) or other device configured to interface signaling with a long-haul network 22, such as a service provider backbone network, the Internet, etc. The access points 12, 14, 16, 18 may facilitate wired and/or wireless communications with the long-haul device 20 and/or clients 26, 28 associated therewith. A controller 24 configured in accordance with the present invention may be included to facilitate managing one or more of the access points 12, 14, 16, 18 according to a load balancing stratagem contemplated herein. The controller 24 may be a standalone, network-based device, as shown, and/or integrated within one or more of the access points 12, 14, 16, 18 and/or the long-haul device to facilitate the operations contemplated herein. While each access point may be managed in accordance with present invention, the operation of a primary access point when supporting signaling with a plurality of clients 26, 28 over a local area network (LAN) 30 is predominately described.

The signaling between the access points 12, 14, 16, 18, clients 26, 28, long-haul device 20 and/or controller 24 may be compliant with the Institute of Electrical and Electronics Engineers (IEEE) 802.11 series of standards, the disclosures of which are hereby incorporated by reference in their entireties herein. The attendant wireless signaling may operate according to Part 11: Wireless LAN Medium Access Control (MAC) and Physical Layer (PHY) Specifications, Amendment 1: Radio Resource Measurement of Wireless LANs (IEEE 802.11k) and/or Amendment 9: Interworking with External Networks (Hotspot 2.0, IEEE 802.11u). The wireless signaling may correspond that described in the CableLabs technical report for Wireless Wi-Fi entitled Wi-Fi Radio Resource Management (RRM)/Self Organizing Networks (SON) Technical Report (WR-TR-RRM-SON-V01-140926) and the CableLabs specification entitled Wi-Fi Provisioning Framework Specification (WR-SP-WiFi-MGMT-I04-140311), the disclosures of which are hereby incorporated by reference in their entirety herein.

The signaling may also correspond with cellular standards, such as Long-Term Evolution (LTE) based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401, 36.306 and 36.902 (self-organizing Network (SON)), the disclosures of which are hereby incorporated by reference in their entireties herein. Of course, the access points 12, 14, 16, 18 and the clients 26, 28 may optionally be considered as Internet of Things (IoT) devices and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc., the disclosures of which are hereby incorporated by reference in their entireties.

The signaling likewise may be wired signaling compliant with Data Over Cable Service Interface Specifications (DOCSIS) 3.x, which as described in Data-Over-Cable Service Interface Specifications DOCSIS 3.1: Physical Layer Specification CM-SP-PHYv3.1-I01-131029, the disclosure of which is hereby incorporated by reference in its entirety. As noted in DOCSIS 3.1, a cable modem (CM), a cable modem termination system (CMTS) or other suitable transmitter and/or receiver may utilize a convergence logical layer between MAC (media access control) and PHY (physical) layers to facilitate OFDM downstream channels and OFDMA upstream channels, such as to map data for transmission. The controller 24 may be configured to facilitate mapping or otherwise scheduling data for transmission according to a transmission schedule, such as according to a MAP. The MAP may be used to represent network resources or space that is available to facilitate network-based data transmission, such as in the manner described in U.S. patent application Ser. No. 12/827,496, entitled Systems And Method Of Decoupling Media Access Control (MAC) And Physical (PHY) Operating Layers and/or Ser. No. 13/890,323, entitled Method and System Operable Facilitate Signaling Transport Over A Network, the disclosures of which are hereby Incorporated by reference in their entirety herein.

A wireless signaling range of each access point 12, 14, 16, 18 if facilitating wireless signaling may vary depending on signal strength, environmental obstructions, antenna configuration, etc. The wireless signaling range of each access point 12, 14, 16, 18 may overlap with one or more of the other access points 12, 14, 16, 18 and/or clients 26, 28 connected to one access point 16 may be within wireless signaling range of one or more of the other access points 14, 18. The access points 12, 14, 16, 18 and the clients 26, 28 may connect or communicate with one or more of the access points 12, 14, 16, 18 as a function of various messages exchange therebetween. A client 26, 28 within signaling range of multiple access points 12, 14, 16, 18 may decide which one of the multiple access points 12, 14, 16, 18 to connect with as a function of advertisement messages transmitted from the corresponding access point 12, 14, 16, 18. IEEE 802.11u, for example, allows a client 26, 28 to query an access point 12, 14, 16, 18 for information like a name of the associated access point operator, capabilities of the associated wireless network, emergency alert information, geo-spatial and civic locations of the access point, potential roaming partners, etc. using Access Network Query Protocol (ANQP) protocol. IEEE 802.11k, section 5, describes additional measurements that may be utilized in accordance with the present invention to facilitate selecting and assessing performance of various access points 12, 14, 16, 18 as a function of a radio resource measurement (RRM), e.g., beacon, frame, channel load, noise histogram, STA statistics, location configuration information (LCI), neighbor report, link measurement and transmit stream/category measurements.

FIG. 2 illustrates an access point 16 in accordance with one non-limiting aspect of the present invention. The access point 16 may include a wireline interface 34 for exchanging signaling with the long-haul device over a wired connection and a wireless interface 36 for exchanging wireless signals with clients 26, 28 in proximity thereto. The access points 12, 14, 16, 18, long-haul device 20 and/or clients 26, 28 may optionally be configured to facilitate Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. The access point 16 may include a controller 38 having a processor and a computer-readable medium with a plurality of non-transitory instructions operable to facilitate controlling the access point 16 to facilitate the load-balancing management contemplated herein. The access point 16 may be considered as a gateway, a cable modem, a router, a eNodeB be, a set-top box (STB), a phone or virtually any other device having capabilities consistent with the operations associated with the present invention (access points may also operate as clients and clients may also act as access points). The access point 16 is shown to include the wireline interface 34 for exemplary purposes and as the wireline interface 34 may be replaced with a wireless interface or eliminated.

One non-limiting aspect of the present invention contemplates the long-haul device 20 limiting throughput for each access point 12, 14, 16, 18 over corresponding mediums 40, 42, 44, 46 associated therewith and/or a common, shared medium. The access points 12, 14, 16, 18 and the clients 26, 28 may be configured to facilitate cellular and/or Wi-Fi communications, including the multi-connection communications described in U.S. patent application Ser. No. 14/558,995, entitled Parallel Scheduling of Multilayered Media, and the multi-layered communications described in U.S. patent application Ser. No. 14/562,677, entitled Unification Sublayer for Multi-Connection Communication, the disclosures of which are hereby incorporated by reference in their entireties herein. The access points 12, 14, 16, 18 illustrated in FIG. 1 depict one arrangement of the access points 12, 14, 16, 18 and is presented for exemplary non-limiting purposes to demonstrate one of many scenarios contemplated by the present invention where access points 12, 14, 16, 18 may cooperate to achieve the optimization contemplated herein. One or more of the access points 12, 14, 16, 18, for example, may be associated with another long-haul device and/or a communication infrastructure governed by a non-affiliated service provider or roaming partner. The wireline interface 40, 42, 44, 46 between the access points 12, 14, 16, 18 and the long-haul device 20 is also presented for exemplary, non-limiting purpose as wireless communication may similarly occur therebetween.

The controller 24 may dictate throughput limitations for each access point 12, 14, 16, 18 so as to share resources of the long-haul device 20 amongst the access points. The throughput limitations generally relates to any restrictions placed on communications between the access points 12, 14, 16, 18 and the long-haul device 20, which may be implemented on according to hardware limitations, communication medium capabilities, licensing/service level agreements or other restrictions otherwise being enforced or necessitated for various reasons. In some cases, the restrictions may be implemented on a directional basis (e.g., downstream throughputs may be set at greater levels than upstream throughput) and/or some access points 12, 14, 16, 18 may be restricted differently than other access points 12, 14, 16, 18 (e.g., one access point may be allocated more throughput than another access point). FIG. 1 illustrates an exemplary configuration where each of the access point 12, 14, 16, 18 communicates with the same long-haul device 20, however, one or more of the access points 12, 14, 16, 18 may facilitate the load-balancing contemplated herein through communications with a another long-haul device. The load-balancing contemplated by one non-limiting aspect of the present invention may be characterized as a mesh-based strategy where the primary access point 16 seeks load-balancing from the other access points 12, 14, 18 (referred to as secondary or neighboring access points).

The load-balancing may be based on a mesh network established between the primary and secondary access points 12, 14, 16, 18 as a function of advertisement messages exchanged between the access points 12, 14, 16, 18, clients 26, 28 associated therewith and/or the long-haul device 20 or controller 24. The advertising messages may correspond with those described above and wirelessly transmitted from each access point 12, 14, 16, 18 to advertise their services and/or other advertisements transmitted through corresponding wired communications. The communications between neighboring access points 12, 14, 16, 18 are predominately described with respect to being wireless communications without intending to necessarily limit the scope and contemplation of the present invention. The use of wireless signaling may be beneficial in enabling neighboring access points 12, 14, 16, 18 to move in and out of the mesh network freely, such as in response to subscriber control or to leverage capabilities of transient devices. The controller 24 or one of the access points 12, 14, 16, 18 desiring load-balancing may analyze the advertisement messages to determine routes 50, 52, 54 within a corresponding mesh network. The routes 50, 52, 54 may originate at the access point requesting load-balancing, i.e., the primary access point 16, and terminate by way of one or more neighboring access points 12, 14, 18 at the long-haul device 20 (the routes are illustrated as terminating at the same long-haul device but as noted some routes may terminate elsewhere).

A first route 52 is shown to end at a first access point 14, a second route 50 is shown to end that a second access point 12 and a third route 54 is shown to end at a third access point 18. The ending access points 12, 14, 18 may be those responsible for exchanging signaling with the long-haul device 20 in the manner desired by the primary access point 16. The routes 50, 52, 54 may include one or more intermediary access points depending on the number of access points being traversed between the primary access point 16 and the corresponding ending access point 12, 14, 18. In the case of wireless signals being exchanged between the access points 12, 14, 16, 18, the routes 50, 52, 54 may include one or more wireless hops. The number of hops may vary depending on the number of intermediary access points, e.g., the number of hops may be one when there are no intermediary access points and the number of hops may equal the number of intermediary access points plus one when intermediary access points are used. The routes 50, 52, 54 may be determined to mimic capabilities desired for load-balancing at the primary access point 16, e.g., if upstream throughput is overloaded or unavailable at the primary access point 16, the routes may be limited to access points 12, 14, 18 having capabilities sufficient to provide upstream throughput.

FIG. 3 illustrates a routing table 60 generated for the mesh network in accordance with one non-limiting aspect of the present invention. The routing table 60 may include a column listing available routes, a column indicating a number of hops, a column indicating a latency estimate and a column indicating available throughput or other measureable, e.g., additional RRM. The latency values may represent time needed to transmit data from the primary access point 16 along the associated route 50, 52, 54 to the long-haul device 20. The latency values may be estimated based on signaling strength, processing capabilities or other values influencing throughput or the rate at which data may be communicated between the associated access points 12, 14, 16, 18. The throughput values may be based on spectrum available to the ending access points 12, 14, 18 of each route 50, 52, 54, e.g., the throughput allocated thereto by the controller 24, bandwidth not actively being consumed or other metric indicating available resources. In a community Wi-Fi scenario, such as that described in U.S. patent application Ser. No. 14/537,845, entitled Network Traffic Prioritization, the disclosure of which is hereby incorporated by reference in its entirety herein, the available throughput may optionally be based on public resources instead of private resources. Any number of evaluations may be performed to determine available resources without deviating from the scope and contemplation of the present invention.

One purpose of the routing table 60 may be to provide information and transport related values sufficient for use in facilitating the load-balancing desired at the primary access point 16. The metrics or other information included therein may be tailored according to the needs of the primary access point 16 so that the primary access point 16 can process information included therein according to a load-balancing algorithm to determine one or more of the routes 50, 52, 54 suitable to ameliorating its load-balancing needs. This may include relaying all the data received from associated clients 26, 28 through one or more of the routes 50, 52, 54 in the event communications between the primary access point 16 and the long-haul device 20 are unavailable or relaying some percentage of the data directly to the long-haul device 20 over the medium 44 and indirectly thereto through one of the routes 50, 52, 54 defined in the mesh topology. The routes 50, 52, 54 may be selected as a function of capabilities, pricing, quality of service (QOS), etc., e.g., the primary access point 16 may estimate an amount of load-balancing needed, such as an amount by which data communication request exceed available upstream throughput, and consult the routing table 60 to determine whether one or more of the routes 50, 52, 54 can make up for the deficiency while still achieving desired QoS.

FIG. 4 illustrates a flowchart 64 of a method for load-balancing in accordance with one non-limiting aspect of the present invention. The method may be embodied in a computer-readable medium having a plurality of non-transitory instructions operable with a processor to facilitate the operations contemplated herein. The computer-readable medium may be included as part of the controller 20 or elsewhere with one or more of devices having capabilities sufficient to implement the contemplated operations, e.g., one or more the controllers 38 included at the access points 12, 14, 16, 18. The method is predominately described with respect to facilitating wireless communications between the primary access point 16 and its neighboring access points 12, 14, 18 and thereafter facilitating wired communications between the access points 12, 14, 16, 18 and the long-haul device 20 for exemplary non-limiting purposes as any type of wireless and/or wired communication may occur. The load-balancing is predominately described with respect to facilitating communications through a mesh network to support data transmission after receipt from one or more clients 26, 28. The load-balancing may be augmented with other load-balancing measures, such as the load-balancing described in U.S. patent application Ser. No. 14/569,669, entitled Wireless Access Point Load Balancing, and Ser. No. 14/569,673, entitled Predictive Load Balancing, the disclosures of which are hereby incorporated by reference in their entireties herein.

Block 66 relates to determining a mesh network. The mesh network may be determined relative to a primary access point 16 requesting the load-balancing. The mesh network may be comprised of a plurality of routes 50, 52, 54 emanating from the primary access point 16 through one or more secondary access points 12, 14, 18 having capabilities sufficient to mimic those desired for load-balancing, e.g., sufficient to replicate upstream or downstream communications between the primary access point 16 and the long-haul device 20. The mesh network determination may include generating the routing table 60 described above or other metrics sufficient to facilitate determining suitable routes. The primary access point 16 may be beyond a wireless signaling range or communication capabilities of one or more neighboring access points 12 such that communications therefrom may be relayed through another one or more of the neighboring access points 14 to facilitate populating the routing table 60 with transport related values. The routing table 60 or mesh network may be periodically updated to us sure continued availability, such as to compensate for throughput or other parameters of the ending access points changing 12, 14, 18, intermediary access points 12, 14, 18 no longer being capable of relaying data and/or transient access points 12, 14, 18 entering and/or leaving the mesh network.

Block 60 relates to determining a need to implement a load-balancing process. The load-balancing need may result from the primary access point 16 losing communication capabilities with the long-haul device 20, such as in the event of maintenance or service disruption, or the primary access point 16 desiring to provide greater service than that which is being allocated thereto, such as in the event the primary access point 16 is temporarily connected to an abnormal number of clients 26, 28. One non-limiting aspect of the present invention contemplates the primary access point 16 being a cable modem associated with a router or other device included within a subscriber's home to provide data related services. The associated subscriber may be being engaging in an event whereby a number of guests may be attempting to access its local wireless network and during which it may be requested to provide data services exceeding its allocated capabilities.

The load-balancing determination may optionally include assessing the particular need for balancing, e.g., whether upstream or downstream signaling require assistance or whether a particular type of service requires assistance. Some services, such as voice over Internet protocol (VoIP) services may be relatively intolerant to latency or other communication delays, while other services, such as data downloads and Web browsing, may be more tolerant to communication delays. The primary access point 16 may desire load-balancing for the services intolerant to latency for a certain period of time, such as when a number guests are present, whereby the load-balancing determination may be based on data or service types as opposed to throughput or other generic causes. Block 70 relates to routing data and other traffic through the primary access point without load-balancing in the absence of a load balancing need, e.g., data received from the clients 26, 28 may be exchanged directly with the long-haul device 20 without reliance on neighboring access points 12, 14, 18.

Block 72 relates to determining a percentage of load-balancing required based on the particular load-balancing need. In the case of providing additional upstream throughput, the percentage may be based on a total amount of data being transmitted by the clients 26, 28 and throughput capabilities of the primary access point 16 to exchange corresponding data with the long-haul device 20. This may include determining a first percentage to represent the percentage of data received the primary access point 16 capable of being exchanging with the long-haul device 20 within desired QoS parameters and a second percentage to represent the percentage of data received the primary access point 16 incapable of being exchanging with the long-haul device 20 within the desired QoS. The second percentage may optionally be determined on a route-by-route basis whereby portions of the second percentage are allocated to one or more of the routes 50, 52, 54 being employed to facilitate the load-balancing. The percentage calculations are intended to represent one use case where reliance on the mesh network is based on percentages of data to be transferred therethrough, however, other metrics may be employed to partition transmissions between the primary access point 16 and one or more the routes 50, 52, 54, such as the above-described data or service types.

Block 74 relates to determining one or more routes 50, 52, 54 of the mesh network to be employed in facilitating the load-balancing. The determined routes 50, 52, 54 may be based on the second percentage or the amount of data being allocated for load-balancing and the capabilities of each route 50, 52, 54 to communicate the corresponding data, e.g., the latency of the routes 50, 52, 54 may be determined to identify those suitable for certain data types or preference may be given to a particular route 50, 52, 54 if it can support transmission of the entire second percentage, e.g., it may be beneficial to use one route 50 instead of two faster routes 52, 54. The route determinations may occur in concert with the percentage determination described above, such as through an iterative process, whereby possible connections/routes are analyzed to determine the influence of one route on another route. The use of the first and third routes 50, 54 may slow communications undesirably as opposed to use of the first and second routes 50, 54 due to the primary access point 16 having to communicate with two different access points (first and third 14, 18) when supporting the first and third routes 50, 54 and only the second access point 14 when supporting the first and second routes 50, 52.

Block 70 relates to routing data according to the determined routes and percentages associated therewith. One non-limiting aspect of the present invention contemplates the primary access point 16 facilitating normal communications with the clients 26, 28, e.g., allowing clients to connect thereto without disruption, and then relying on one or more of the routes 50, 52, 54 to supplement or meet demands the primary access point 16 would be unable to otherwise meet. The primary access point 16 may be able to maintain normal communications with the clients 26, 28 due to wireless signaling capabilities therebetween exceeding or being faster than those occurring between the primary access point 16 and the long-haul device 20, e.g., the clients 26, 28 may be able to communicate wirelessly in the upstream direction with the primary access point 16 at $20x$ or more times the rate that the primary access point 16 is able to provide corresponding wired upstream communications with the long-haul device 20. The capabilities of the faster performing wireless communications between the primary access point 16 and the clients 26, 28 as well as the primary access point 16 the neighboring access points 12, 14, 18 may be leveraged in accordance with the present invention to improve performance by spreading demand across neighboring access points 12, 14, 18 when the neighboring access points 12, 14, 18 are operating below maximum levels.

One non-limiting aspect of the present invention contemplates reducing cost and improving Service Quality via Mesh Networking. The high cost of individual subscription to high throughput data services (e.g., Fibre-to-Home or high speed Cable Data services) can be subsidized via sharing the links among multiple users in the manner contemplated herein. These multiple users gain data access via mesh network comprised of available cable/Fiber infrastructure elements and its connections such as MoCA, Wi-Fi and LTE, etc. Deployment of high throughput data services (e.g., FTTH, high throughput D3.1 services) has been cost prohibitive to individuals users. One aspect of this invention is to seek the usage of current cable and its connected infrastructure (wired or wireless) to offset such cost for more deployable and profitable services. A mesh network is comprised of a high throughput entity, (e.g, FTTH node or CMTS) and its connected elements (e.g., CMs.Ethernet, Wi-Fi, LTE, etc) via local mesh network. The high cost of FTTH can be reduced via sharing same link among several households. It requires 1 drop point at one home site and group members can share via mesh network as mentioned. The throughput performance between CMTS/CM can be further augmented via auxiliary path usage via Wi-Fi, MoCA, etc. It offers benefit of less frequent change of CMTS/CM scheduling, resulting in less control/management message overhead. If also offers benefit of offer incentives to high speed service user via sharing his link among group users.

One aspect of the invention relates to load balancing in MDU scenarios-Wifi sharing. It becomes really difficult to sustain the throughputs when there is a sudden influx of people in a MDU. This invention provides ways to tap the potential of neighboring APs in the MDUs (assuming these neighboring APs are not loaded and are nearby to the serving AP). In the event, a single MSO is responsible for Wifi in an MDU complex. Assume there is 1 AP/MDU. Each AP is configured to handle 'x' clients. MDU1 has AP1 from vendor1. MDU2 has AP2 from vendor2 and so on. In a scenario wherein the host of MDU1 has a party at his/her place, then assuming that about y guests show up (y>x). If AP1 knows its neighbors AP2, AP3 since they belong to the same MSO (Please see Common APIs for neighbor list building) there should be the concept of load balancing among the APs. This could be done by AP1 requesting AP2 for a temporary password (say for 5 hours may be). This password can then be given to the additional guests. Assuming AP2 is not heavily loaded, the additional guests can smoothly be given enough BW so that they get the min. throughput rates. The user of AP2 (MDU2 resident) will not be charged for those 4 hours for the additional traffic that is being generated. Instead, owner of MDU1 pays on a per hourly basis for the number of hours that the password has been leased to him/her. Optionally, a cap on the number of times that the guest password is generated from the neighboring APs. Note that this scenario can be implemented only when the MDUs are close by which means that the target-AP is in close proximity to the serving AP. This assures that the additional traffic on the target-AP can be handled well. Once AP1 gets the temporary password from AP2, the clients that haven't been associated at all to AP1 ('y-n' clients) will be given that password and they can directly associate with AP2.

Common APIs for neighbor list building can be utilized where WLC and APs are from a single vendor such that the deployed APs are from the same vendor, which talk to a common WLC. A neighbor list can be built on each AP by the WLC since the WLC sees all the deployed APs. Also, AP to AP handover/client mobility is through the WLC. If APs are from different vendors with corresponding WLCs (same SSID), the client can perform a handoff to the neighboring AP only if the SSID is same (Community Wifi, Wifi in stadiums, hotels, conferences etc.) Since the services are from a single MSO, the WLC database can be configured to include basic information about all the APs in the MSO deployment of that area. If APs are from different vendors with corresponding WLCs (different SSID) AP1 would report all the other APs as rogue to its WLC. Since both the APs are operating in a single MSO network, they shouldn't consider each other as rogue even though they are from different vendors. Hence, this would call for an API to be defined on each of the APs. This API should be MSO network centric but vendor agnostic. A common API on both the APs would ensure that there would be no rogue APs in an MSO network. The 1st step is to authenticate the APs with the MSO network to make sure that both of them are not rogue. Then, it involves building up the neighbor list at each of the APs. On the other end of this load balancing spectrum, if say an AP is not loaded at all specially during the nights when no client attaches to the AP/certain weekdays when the clients are not present; (basically when there are no clients authenticated+associated to that AP) then the CMTS should signal that AP to get into sleep mode. The present invention may be helpful in dense MDU AP deployment scenarios. Also in the dorms of schools and universities. Tapping the potential of an underloaded, neighboring AP may be beneficial, especially since the owner of the MDU pays for the additional services that he/she gets from the neighboring MDU-AP, i.e., it is a good way to generate revenue especially when there is a sudden influx of people in need of Wifi services with sustainable throughputs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for receiving data in a communication system, the method comprising:
   receiving, at a first network element, first data from one or more wireless clients of a first wireless access point at least partially via a first wireline communication link between the first wireless access point and the first network element; and
   receiving, at the first network element, second data from the one or more wireless clients of the first wireless access point at least partially via a second wireline communication link between a second access point and the first network element.

2. The method of claim 1, wherein the second access point is a second wireless access point.

3. The method of claim 2, wherein the second wireless access point operates according to an Institute of Electrical and Electronics Engineers (IEEE) 802.11 standard.

4. The method of claim 2, wherein the second wireless access point operates according to a cellular wireless standard.

5. The method of claim 1, wherein the second access point is in communication with the first wireless access point at least partially via a wireless communication link.

6. The method of claim 5, wherein the wireless communication link operates according to an Institute of Electrical and Electronics Engineers (IEEE) 802.11 standard.

7. The method of claim 5, wherein the wireless communication link operates according to a cellular wireless standard.

8. The method of claim 1, wherein the second access point is in communication with the first wireless access point at least partially via a multimedia over coax (MoCA) communication link.

9. The method of claim 1, wherein the first network element comprises a fiber node.

10. The method of claim 1, wherein the first network element comprises a modem termination system.

11. The method of claim 1, wherein a throughput of one or more of the first wireline communication link and the first wireless access point is at least partially limited by the first network element.

12. The method of claim 1, further comprising determining a plurality of routes from the first wireless access point to the first network element.

13. The method of claim 12, wherein one of the plurality of routes from the first wireless access point to the first network element comprises a route through the second access point.

14. The method of claim 1, wherein the first wireless access point is an Internet of Things (IoT) access point.

15. A method for receiving data in a communication system, the method comprising:
  receiving, at a first network element, first data from one or more clients of a first access point at least partially via a first wireline communication link between the first access point and the first network element; and
  receiving, at the first network element, second data from the one or more clients of the first access point at least partially via a second wireline communication link between a second access point and the first network element.

16. The method of claim 15, wherein the second access point is in communication with the first access point at least partially via a wireless communication link.

17. The method of claim 15, wherein the second access point is in communication with the first access point at least partially via a multimedia over coax (MoCA) communication link.

18. A method for receiving data in a communication system, the method comprising:
  receiving, at a first network element, first data from one or more wireless clients of a first wireless access point at least partially via a first wireless communication link between the first wireless access point and the first network element; and
  receiving, at the first network element, second data from the one or more wireless clients of the first wireless access point at least partially via a second wireless communication link between a second access point and the first network element.

19. The method of claim 18, wherein the second access point is in communication with the first wireless access point at least partially via a wireless communication link.

20. The method of claim 18, wherein the second access point is in communication with the first wireless access point at least partially via a multimedia over coax (MoCA) communication link.

21. The method of claim 1, wherein the first network element is a central network element.

22. The method of claim 15, wherein the first network element is a central network element.

23. The method of claim 18, wherein the first network element is a central network element.

* * * * *